United States Patent
Hu et al.

(10) Patent No.: US 7,577,120 B2
(45) Date of Patent: Aug. 18, 2009

(54) ALLOCATION OF POWER AND CHANNELIZATION CODES FOR DATA TRANSFERS

(75) Inventors: Teck H. Hu, Budd Lake, NJ (US); Jung-Tao Liu, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 806 days.

(21) Appl. No.: 10/612,438

(22) Filed: Jul. 2, 2003

(65) Prior Publication Data

US 2005/0002357 A1   Jan. 6, 2005

(51) Int. Cl.
*H04B 7/216*   (2006.01)

(52) U.S. Cl. ......... 370/335; 370/208; 370/209; 370/342

(58) Field of Classification Search ......... 370/335, 370/342, 332, 208, 209
See application file for complete search history.

(56) References Cited

U.S. PATENT DOCUMENTS

| | | | | |
|---|---|---|---|---|
| 6,731,668 B2* | 5/2004 | Ketchum | | 375/130 |
| 6,775,256 B1* | 8/2004 | Hill et al. | | 370/335 |
| 6,999,517 B1* | 2/2006 | Bombay et al. | | 375/257 |
| 7,068,683 B1* | 6/2006 | Lundby et al. | | 370/493 |
| 7,471,927 B2* | 12/2008 | Chen et al. | | 455/39 |
| 2002/0034170 A1* | 3/2002 | Tiedemann et al. | | 370/335 |
| 2003/0039217 A1* | 2/2003 | Seo et al. | | 370/318 |
| 2003/0063588 A1* | 4/2003 | Lee et al. | | 370/335 |
| 2003/0123477 A1* | 7/2003 | Gollamudi et al. | | 370/465 |
| 2004/0028006 A1* | 2/2004 | Kayama et al. | | 370/320 |
| 2004/0090938 A1* | 5/2004 | Hsu | | 370/335 |

OTHER PUBLICATIONS

David N. C. Tse et al., "Multiaccess Fading Channels—Part I: Polymatroid Structure, Optimal Resource Allocation and Throughput Capacities," *IEEE Transactions on Information Theory*, vol. 44, No. 7, pp. 2796-2815 (Nov. 1998).
R. Knopp, Information Capacity and Power Control in Single-Cell Multiuser Communications, *IEEE*, pp. 331-335 (1995).
Syed Ali Jafar et al., "Optimal Rate and Power Adaptation for Multirate CDMA," *IEEE*, pp. 994-1000 (2000).
Soon-Ghee Chua et al., "Variable-Rate Variable-Power MQAM for Fading Channels," *IEEE*, pp. 815-819 (1996).

* cited by examiner

*Primary Examiner*—Patrick N Edouard
*Assistant Examiner*—Shantell Heiber (57) ABSTRACT

A method of communication includes assigning at least one channelization code to a data packet. A portion of power available for communicating is assigned to the channelization code based on a channel quality metric. A system includes a transmitter, and an allocation unit. The transmitter is adapted to communicate data packets. The allocation unit is adapted to assign at least one channelization code to a data packet and assign a portion of power available for communicating to the channelization code based on a channel quality metric associated with the data packet.

29 Claims, 7 Drawing Sheets

ALLOCATION OF POWER AND CHANNELIZATION CODES FOR DATA TRANSFERS

BACKGROUND OF THE INVENTION

1. Field of the Invention

This invention relates generally to the field of telecommunications and, more particularly, to wireless communications.

2. Description of the Related Art

Owners and/or operators of communication networks, i.e., the service providers, are constantly searching for methods and equipment that can meet the changing needs of their subscribers. Subscribers of communication networks, including wireless communication networks, require higher information throughput in order to exploit the expanding range of services being provided by current communication networks. For example, wireless communication subscribers are now able to have simultaneous access to data networks such as the Internet and to telephony networks such as the Public Switched Telephone Network (PSTN).

Speech transmission is the main service supported by the first and second-generation wireless communication systems. However, the demand for data services is ever-increasing. Data traffic, unlike voice traffic, tends to occur in bursts and is more delay tolerant. The amount of data that can be sent to a user is dependent on the amount of data that has arrived for transfer to the user. One technique for communicating data to users includes identifying the users with data packets ready for transmission, prioritizing the users in order by channel condition, and sending the data using the available channel resources.

Downlink traffic for different traffic rates is conveyed using a multiple rate combination of the basic rate. Traffic with rate m times the basic rate may be sent using m codes and the received signal power may be m times larger than the basic power allocated to the basic rates. However, in the case of a shared data and voice application, the total available power at the transmitter for data traffic varies due to various reasons such as overhead power allocation or dynamic changes in the voice user's power consumption. These variations could be very slow (e.g., in the order of hours) or could be fast varying (e.g., as function of the channel variation in the order of milliseconds). In addition, the total system available power at the transmitter may also change over time. Hence, an assumption of fixed power allocation for data service, for example, is not valid in these situations.

In Universal Mobile Telecommunications Systems (UMTS), users are code multiplexed using different orthogonal variable spreading factor (OVSF) codes and variable processing gain. Typically, the number of codes assigned to the users depends on the size of the data packet to be transferred, and the available transmit power is evenly divided amongst the total number of codes. Assigning the channelization codes and then dividing the available power amongst the codes does not optimize the capacity of the data channels. In the case where the total allocated codes for a user are assigned based on the user packet or buffer size, the total power assigned is thus proportional to the total number of assigned codes rather than optimized to the channel conditions. However, users with better channel conditions may not require the same power to meet a target error rate than a user with a more degraded channel.

The present invention is directed to overcoming, or at least reducing the effects of, one or more of the problems set forth above.

SUMMARY OF THE INVENTION

One aspect of the present invention is seen in a method of communication. The method includes assigning at least one channelization code to a data packet. A portion of power available for communicating is assigned to the channelization code based on a channel quality metric.

Another aspect of the present invention is seen in a system including a transmitter, and an allocation unit. The transmitter is adapted to communicate data packets. The allocation unit is adapted to assign at least one channelization code to a data packet and assign a portion of power available for communicating to the channelization code based on a channel quality metric associated with the data packet.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. Moreover, it should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
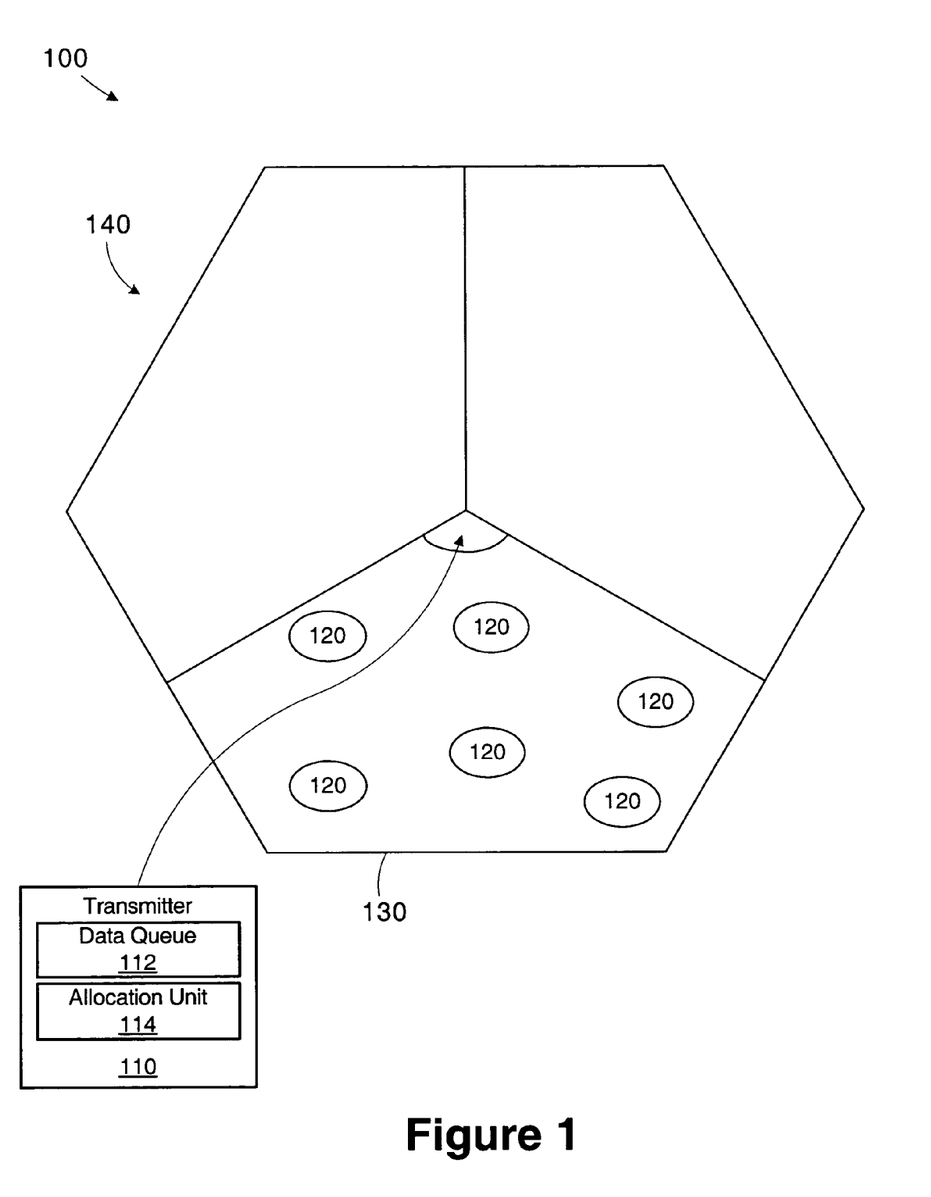
FIG. 1 is a simplified block diagram of a communications system in accordance with one illustrative embodiment of the present invention.

Referring now to FIG. 1, a simplified block diagram of a communications system 100 in accordance with one embodiment of the present invention is provided. A transmitter 110 communicates with a plurality of users 120 within a sector 130 of a communications cell 140. The transmitter 110 includes a data queue 112 and an allocation unit 114. As will be described in greater detail below, the allocation unit 114 employs an iterative technique to assign channelization codes and power levels to optimize the capacity of a data channel used to communicate data with the users 120. In the illustrated embodiment, the transmitter 110 is a conventional multicode spread spectrum transmitter, the construct and operation of which are well known to those of ordinary skill in the art.

In the illustrated embodiment, the communications system 100 is a multi-cell and multi-code packet data code division multiple access (CDMA) system with three-sector cells, however, the application of the present invention is not limited to any particular system architecture. For packet data, downlink traffic is communicated over a shared channel in which each user 120 listens for indication that data currently sent in the shared channel is destined for the particular user 120. Channel quality information for the receiver (not shown) of the user 120 is fed back to the transmitter 110 through a feedback channel in the uplink. Each sector 130 has an associated transmitter 110 with an allocation unit 114.

For its sector 130, the allocation unit 114 can allocate at most $N_C$ orthogonal channelization codes with the same spreading factor to a given user. A maximum of $N_u$ users can receive packets over the same transmission time interval (TTI). For ease of illustration and to avoid obscuring the instant invention, it is assumed that the packet transmission time interval is a constant. For example, the current high speed downlink packet access (HSDPA) channel implemented in the publicly available Universal Mobile Telecommunications System (UMTS) standard has a fixed spreading factor of 16 among which at most 15 channelization codes can be used to transmit one packet over a 2 ms TTI. HSDPA also allows more than one of the users to be code multiplexed during a TTI (i.e., a user may be assigned more than one channelization code. Hybrid-ARQ (Automatic Repeat Request) operation with asynchronous incremental redundancy (IR) is performed for each transmission. The allocation unit 114 maintains a list of the active data users in the sector 130. In general, the allocation unit 114 associated with each sector 130 selects a user 120 based on the user data backlog, the QoS (quality of service) requirements for each packet, the available system resources, and the feedback from each user 120 listed in its user active set.

The available system resource includes the number of channelization codes left after taking into account all dedicated and common channels other than the downlink shared packet channel, such as the common pilot channel, dedicated control channel, signaling channels, etc.; and the available power for transmitting packet data at the time of scheduling. The user feedback includes channel quality and acknowledgement/non-acknowledgement (ACK/NACK) of the previously received packet.

The allocation unit 114 performs two major functions, first, it prioritize the packets based on buffer backlog and QoS requirements; then it determines how many packets can be served from each priority level based on the channel quality and the available system resources. The allocation unit 114 attempts to optimize system capacity in accordance with the method depicted in FIG. 2, which shows a simplified flow diagram of a method for communicating in accordance with another illustrative embodiment of the present invention. In block 200, at least one channelization code is assigned to a data packet. In block 210, a portion of power available for communicating is assigned to the channelization code based on a channel quality metric. As used herein, the term "data packet" is intended to include any set of data elements to be communicated and is not limited to any particular type of data (e.g., mathematical data, voice data, video data, raw binary data, etc.) or any particular protocol.

Figure 2:
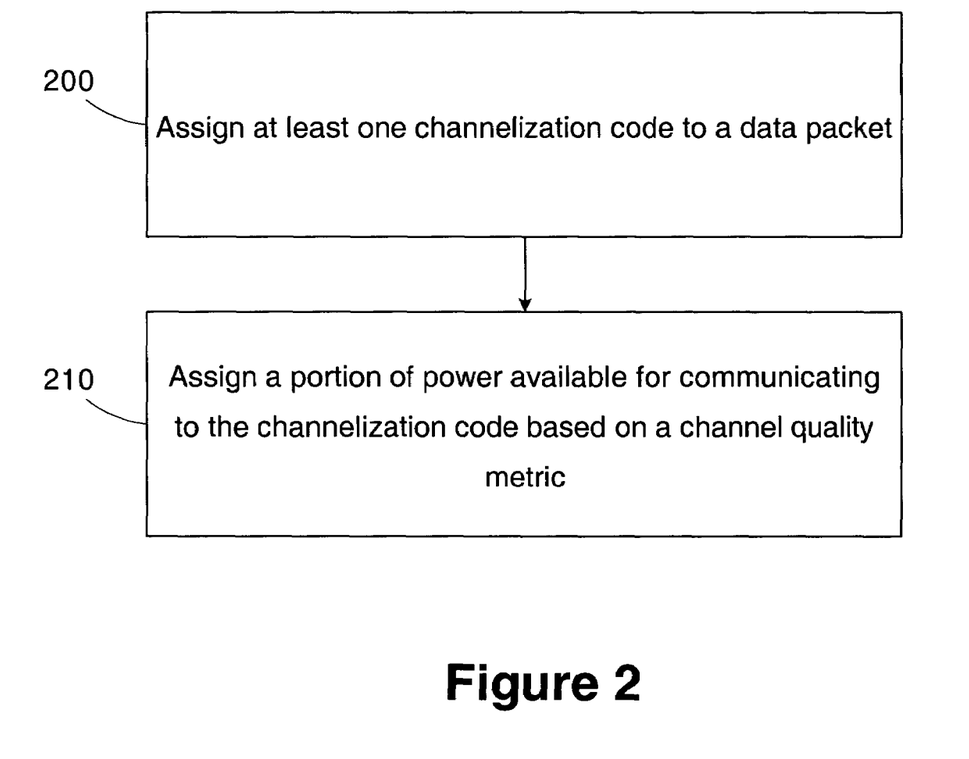
FIG. 2 is a simplified flow diagram of a method of communicating in accordance with another illustrative embodiment of the present invention.

The operation of the allocation unit 114 in implementing the method of FIG. 2 is now described in greater detail. The allocation unit 114 prioritizes the packets into $N_p$ different priority classes. Assume that for each priority class, there are $M_p$ packets waiting to be transmitted. Therefore, in a given sector 130, there are $N_p*M_p$ packets in the data queue 112. Note that any given user 120 can have more than one packet in the queue and each user 120 can be scheduled to receive more than one packet during the same TTI. It may be efficient to allow one of the users 120 to have more than one packet assigned under various conditions. For example, the user 120 may have a very good channel condition, and after taking out the required number of channelization codes for the first data packet transmission, the same user 120 may be the best remaining user 120 among all other users 120. Hence, the second data packet to the same user 120 is scheduled using a portion of the remaining channelization codes. Another possible situation is when there are packets for the same user 120 from different priority classes. Note that if two packets from the same priority class are scheduled to transmit to the same user during the same TTI, both packets will have the same power for all the channelization codes allocated to the packets, since all orthogonal channelization codes suffer the same fading and path loss for a given sector 130/user 120 pair. In some embodiments, if two packets are from different priority classes, then the two packets may be transmitted using different power levels, due to the fact that the available power for data packets from different priority classes may be different.

The allocation unit 114 determines how much power should be allocated to each channelization code and the number of channelization codes assigned to each data packet for its transmission. For the following illustration, $P_{data}$ is the total available power for packet data for a given sector 130 and $N_c$ represents the number of remaining channelization codes. Since the allocation unit 114 strives to fulfill the QoS requirements, it first attempts to serve the packets among the highest priority class. In determining the power and channelization code assignments, the allocation unit 114 attempts to optimize the sum of the Shannon capacity for all channels in bit/s/hz, which is defined by:

$$\frac{C}{B} = \sum_i \log_2(1 + SNR_i), \quad (1)$$

where B is the system bandwidth, and the summation is over all the channelization codes used for packet data. For ease of illustration and to avoid obscuring the instant invention, it is assumed that the channels are flat Rayleigh fading channels that are quasi-static over the period of interest. The signal-to-noise ratio per code is defined by:

$$SNR_i \equiv \frac{S_i}{N_i} = \frac{|\alpha_i|^2 \beta_i P_{data}}{I_{oc} + N_o}, \quad (2)$$

where $\alpha_i$ is the complex-valued flat Rayleigh fading channel gain, $\beta_i$ is the power fraction allocated to the i-th channelization code, and $I_{oc}$ is the total interference from other cells. For purposes of this illustration, it is assumed that the QoS class for all packets is the same, and each user 120 has, at most, one packet in that QoS class. Further illustrations will address multiple QoS classes and multiple packets. The allocation unit 114 attempts to define values for $\beta_i$ such that Equation (1) is maximized and $$\sum_i \beta_i = 1, \quad \beta_i \geq 0, \forall i. \tag{3}$$

Let M be the number of data users in a sector 130 and $W_M$ be the set of channelization codes assigned to the m-th user's packet. If $\phi_m$ is the size of the set $W_M$, then Equation (3) can be written as:

$$\sum_{m=1}^{M} \phi_m \chi_m = 1, \quad \chi_m \geq 0, \forall m, \tag{4}$$

where $\chi_m = \beta_i$, $\forall i \in W_m$ is the fraction of data power that is assigned to each of the channelization codes for user m. Note that $\phi_m$ is subject to the following constraint:

$$\sum_{m=1}^{M} \phi_m = N_c, \phi_m \in \mathbb{N}. \tag{5}$$

The following cost function for the optimization problem may be defined using Lagrange multipliers:

$$J(\chi_m, \phi_m) = \sum_{m=1}^{M} \sum_{i \in C_m} \log_2\left(1 + \frac{|\eta_m|^2 \chi_m P_{data}}{I_{oc} + N_o}\right) + \lambda\left(\sum_{m=1}^{M} \phi_m \chi_m - 1\right) + \mu\left(\sum_{m=1}^{M} \phi_m - N_c\right), \tag{6}$$

where $\eta_m = \alpha_i$, $\forall i \in C_m$ is the complex flat fading for the m-th data user. The first term of the Equation (6) can be further simplified, resulting in:

$$J(\chi_m, \phi_m) = \sum_{m=1}^{M} \phi_m \log_2\left(1 + \frac{|\eta_m|^2 \chi_m P_{data}}{I_{oc} + N_o}\right) + \lambda\left(\sum_{m=1}^{M} \phi_m \chi_m - 1\right) + \mu\left(\sum_{m=1}^{M} \phi_m - N_c\right). \tag{7}$$

Taking the derivative of Equation (7) with respect to $\chi_m$, yields the following set of equations:

$$\frac{\partial J(\chi_m, \phi_m)}{\partial \chi_m} = \frac{\phi_m \gamma_{DPR} \hat{C}_{pilot,m}}{\left(1 + \chi_m \gamma_{DPR} \hat{C}_{pilot,m}\right)} + \lambda \phi_m = 0, \tag{8}$$

where $\hat{C}_{pilot,m}$ is the channel quality estimate from the m-th user based on the measurement from the common pilots, and is defined as:

$$\hat{C}_{pilot,m} = \frac{|\eta_m|^2 P_{pilot}}{I_{oc} + N_o}, \tag{9}$$

and $\gamma_{DPR}$ is the data-to-pilot power ratio which can be expressed as:

$$\gamma_{DPR} = \frac{P_{data}}{P_{pilot}}. \tag{10}$$

The data-to-pilot power ratio is assumed to be known at the sector 130. The channel quality estimates are fed back from each user 120 to the transmitter 110 on a periodic basis. Note that the channel quality estimates used in Equation (9) are the same for all codes used for the same user. Therefore, even in a multicode scenario, only one channel quality value is fed back from a given user 120. Equation (8) can be written as:

$$\frac{1}{\gamma_{DPR} \hat{C}_{pilot,m}} + \chi_m = -\frac{1}{\lambda}. \tag{11}$$

Combining Equations (4) and (11) yields:

$$\sum_{m=1}^{M} \phi_m \chi_m = 1 = -\sum_{m=1}^{M} \frac{\phi_m}{\lambda} - \sum_{m=1}^{M} \frac{\phi_m}{\gamma_{DPR} \hat{C}_{pilot,m}}. \tag{12}$$

Solving Equation (12) for $\lambda$, and incorporating Equation (5) yields:

$$\lambda = \frac{-N_c}{1 + \sum_{m=1}^{N} \frac{\phi_m}{\gamma_{DPR} \hat{C}_{pilot,m}}}, \tag{13}$$

where $\lambda$ represents an intermediate optimization parameter associated with the power constraint. Substituting Equation (13) into Equation (7) and optimizing over $\phi_m$ yields:

$$\frac{\partial J(\chi_m, \phi_m)}{\partial \phi_m} = \tag{14}$$

-continued $$\log_2\left(1 + \frac{|\eta_m|^2 \chi_m P_{data}}{I_{oc} + N_o}\right) - \frac{N_c \chi_m}{1 + \sum_{m=1}^{M} \frac{\phi_m}{\gamma_{DPR} \hat{C}_{pilot,m}}} + \mu = 0.$$

Multiplying both sides of Equation (14) by $\phi_m$, summing over all m, and combining with Equations (4) and (5) yields:

$$\mu = \frac{1}{1 + \sum_{m=1}^{M} \frac{\phi_m}{\gamma_{DPR} \hat{C}_{pilot,m}}} - \frac{1}{N_c} \sum_{m=1}^{M} \phi_m \log_2\left(1 + \frac{|\eta_m|^2 \chi_m P_{data}}{I_{oc} + N_o}\right), \quad (15)$$

or from Equation (13):

$$\mu = -\frac{\lambda}{N_c} - \frac{1}{N_c} \sum_{m=1}^{M} \phi_m \log_2\left(1 + \frac{|\eta_m|^2 \chi_m P_{data}}{I_{oc} + N_o}\right), \quad (16)$$

where $\mu$ represents another intermediate optimization parameter associated with the number of channelization codes.

As evidenced by Equations (14) and (16) a non-linear optimization problem exists, and a closed-form solution to this problem is difficult to find. However, for $M \leq 3$, it is possible to solve for $\chi_m$ and $\phi_m$ iteratively as illustrated by the simplified flow diagram of FIG. 3.

Figure 3:
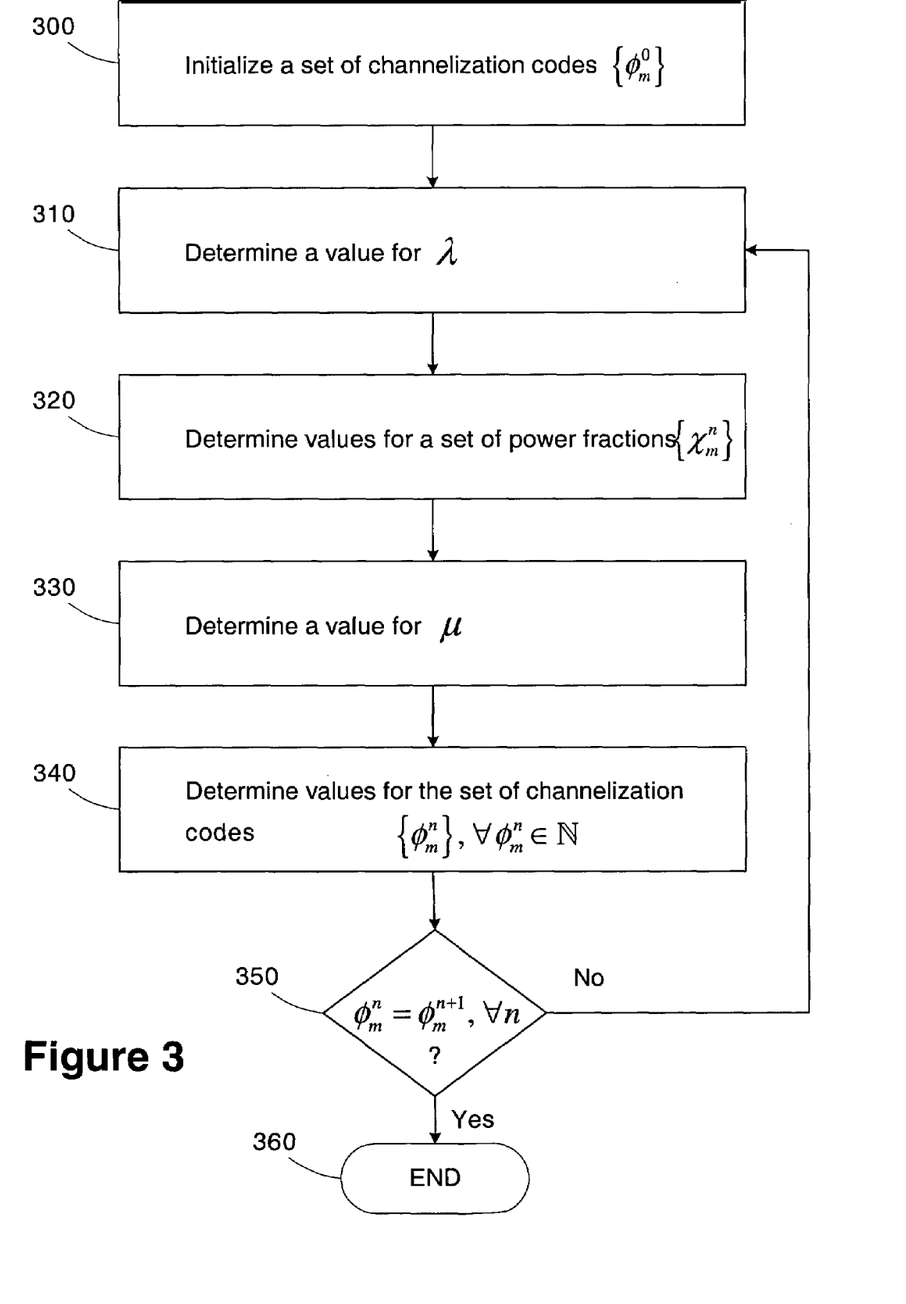
FIG. 3 is a simplified flow diagram of one particular embodiment of a method for allocating power and channelization codes to implement the communicating of FIG. 2.

In block 300, the set of channelization codes for the users 120, $\{\phi_m^0\}$, is initialized. The values for $\{\phi_m^0\}$ may be set at arbitrary values (e.g., even number of channelization codes for each user 120 with an associated data packet). In block 310, the value of $\lambda$ is determined in accordance with Equation (13). In block 320, values for the set of power fractions, $\{\chi_m^n\}$, are determined for the users 120 with assigned channelization codes in accordance with Equation (11). In block 330, the value of $\mu$ is determined in accordance with Equation (14). In block 340, the values for the set of channelization codes, $\{\phi_m^n\}$, $\forall \phi_m^n \in \mathbb{N}$, are determined in accordance with Equations (4), (5), and (16). In block 350, it is determined if the value of $\phi_m^n = \phi_m^{n+1}$, $\forall n$, where n is sufficiently large (i.e., the solution has converged). If the solution converges, the iteration terminates at block 360. Otherwise, the iterative process repeats at block 310.

The previous illustration assumes that data users 120 always have enough data in the buffer for transmit when selected by the allocation unit 114 and given a set of channelization codes for the transmission. To obtain a more general solution, additional constraints may be added on the set of assigned channelization codes, $\phi_m$. These constraints include factors such as the data queue size of the user 120, and the target error rate requirements. Also, in the previous example, there are no specific restrictions imposed upon the assignment of the channelization codes for each data user (i.e., other than they have to satisfy Equations (4), (5) and (13)).

Equation (13) can be rewritten as follows:

$$\sum_{m=1}^{M} \frac{\phi_m}{\gamma_{DPR} \hat{C}_{pilot,m}} = \frac{-N_c}{\lambda} - 1. \quad (17)$$

The optimization involves three linear equations with M variables. Therefore, for M>3, there are more than one solution for the set $\{\phi_m\}$ By providing more structure in $\{\phi_m\}$ a scheduling algorithm for users with limited queue sizes and pre-defined target error rates may be determined.

One constraint imposed is to limit the number of modulation coding schemes (MCS) to a finite set, such as the set defined in Table 1, which shows an example of a finite set as a function of the information block size (denoted code block size), and the number of channelization codes. Table 1 is built on a multicode direct sequence CDMA (DS-CDMA) system, using a fixed spreading factor of 16. Exemplary parameters defined by the UMTS specification include a chip rate of 3.84 Mcps and a slot duration of 0.67 msec. Table 1 defines a pre-defined relation between the user buffer size, the number of channelization codes, and the MCSs that are possible under the given conditions. The allocation unit 114 takes these factors and relationships into account when assigning the available power and channelization codes to different users 120.

TABLE 1

Modulation and Coding Schemes versus Channelization Codes, and the Required Es/Nt for 1% Packet Error Rate

| Number of Channel Codes | 1280 bits code block 640 Kbps | 2560 bits code block 1280 Kbps | 3840 bits code block 1920 Kbps | 5120 bits code block 2560 Kbps | 7680 bits code block 3840 Kbps | 11520 bits code block 5760 Kbps | 15360 bits code block 7680 Kbps |
|---|---|---|---|---|---|---|---|
| 14 | QPSK −6.98 dB | QPSK −3.97 dB | QPSK −2.48 dB | QPSK −0.63 dB | QPSK 1.29 dB | 16QAM 5.65 dB | 16QAM 8.1 dB |
| 12 | QPSK −6.3 dB | QPSK −3.34 dB | QPSK −1.75 dB | QPSK 0.34 dB | QPSK 2.75 dB | 16QAM 6.85 dB | 16QAM 9.7 dB |
| 10 | QPSK −5.4 dB | QPSK −2.46 dB | QPSK −0.73 dB | QPSK 1.7 dB | 16QAM 5.18 dB | 16QAM 8.53 dB | — |
| 8 | QPSK −4.5 dB | QPSK −1.15 dB | QPSK 0.80 dB | QPSK 3.74 dB | 16QAM 6.86 dB | — | — |
| 6 | QPSK −3.19 dB | QPSK 0.55 dB | QPSK 3.35 dB | 16QAM 6.02 dB | 16QAM 9.66 dB | — | — |

TABLE 1-continued

Modulation and Coding Schemes versus Channelization
Codes, and the Required Es/Nt for 1% Packet Error Rate

| Number of Channel Codes | 1280 bits code block 640 Kbps | 2560 bits code block 1280 Kbps | 3840 bits code block 1920 Kbps | 5120 bits code block 2560 Kbps | 7680 bits code block 3840 Kbps | 11520 bits code block 5760 Kbps | 15360 bits code block 7680 Kbps |
|---|---|---|---|---|---|---|---|
| 4 | QPSK −1 dB | QPSK 3.95 dB | 16QAM 7 dB | — | — | — | — |
| 2 | QPSK 4.1 dB | 16QAM 9.9 dB | — | — | — | — | — |

After call admission control is performed at the core network (not shown), a set of users 120 are admitted with different QoS classes. For ease of illustration and to avoid obscuring the instant invention, it is assumed that any user 120 in the set has only one QoS value. The allocation unit 114 at the sector 130 then sub-divides the users 120 into different QoS categories. Again, users 120 from the same QoS class are scheduled and processed simultaneously, while users from different QoS classes are processed from highest quality down to the more delay tolerable classes separately.

In the following example, users 120 from the Same QoS class are scheduled. It is assumed that there are M data users in the same QoS class waiting to be scheduled and that there are no Hybrid-ARQ or IR operations initially. The allocation unit 114 first sorts the M users by their priorities in descending order according to some fairness criteria to form an ordered set, $U=\{u_i | u_1 \leq u_2 \leq \ldots \leq u_M\}$. Exemplary fairness techniques known to those of ordinary skill in the art include round robin, maximum carrier to interference ratio (C/I), proportional fair, and the like. The allocation unit 114 then looks at the data queue 112 for the user 120 and determines the transmit code block sizes for each user 120. For example, if user 1, $u_1$, has 2000 bits in the data queue 112, then, the code block size of 1280 bits is selected for its next transmission. Based on the pre-determined target packet error rate, the allocation unit 114 then selects the MCS based on the estimates of the received signal-to-noise ratios (SNR) for each user 120. The estimate is computed using Equation (9) given the pilot power and the code power for each channel are known at the sector 130. The received SNR estimates can be expressed as:

$$\hat{C}_m = \frac{|\eta_m|^2 \chi_m P_{data}}{I_{oc} + N_o}, \forall\, m. \quad (18)$$

Using Equation (18), the allocation unit determines the corresponding number of channelization codes to be used for the transmission by looking at the required SNR in the finite set of MCSs for the selected code block size. For example, if user 1 has an estimated receive signal-to-noise ratio of −3 dB, and a code block size of 1280 bits, four spreading codes will be assign to user 1 for the next transmission, as shown in Table 1.

Figure 4:
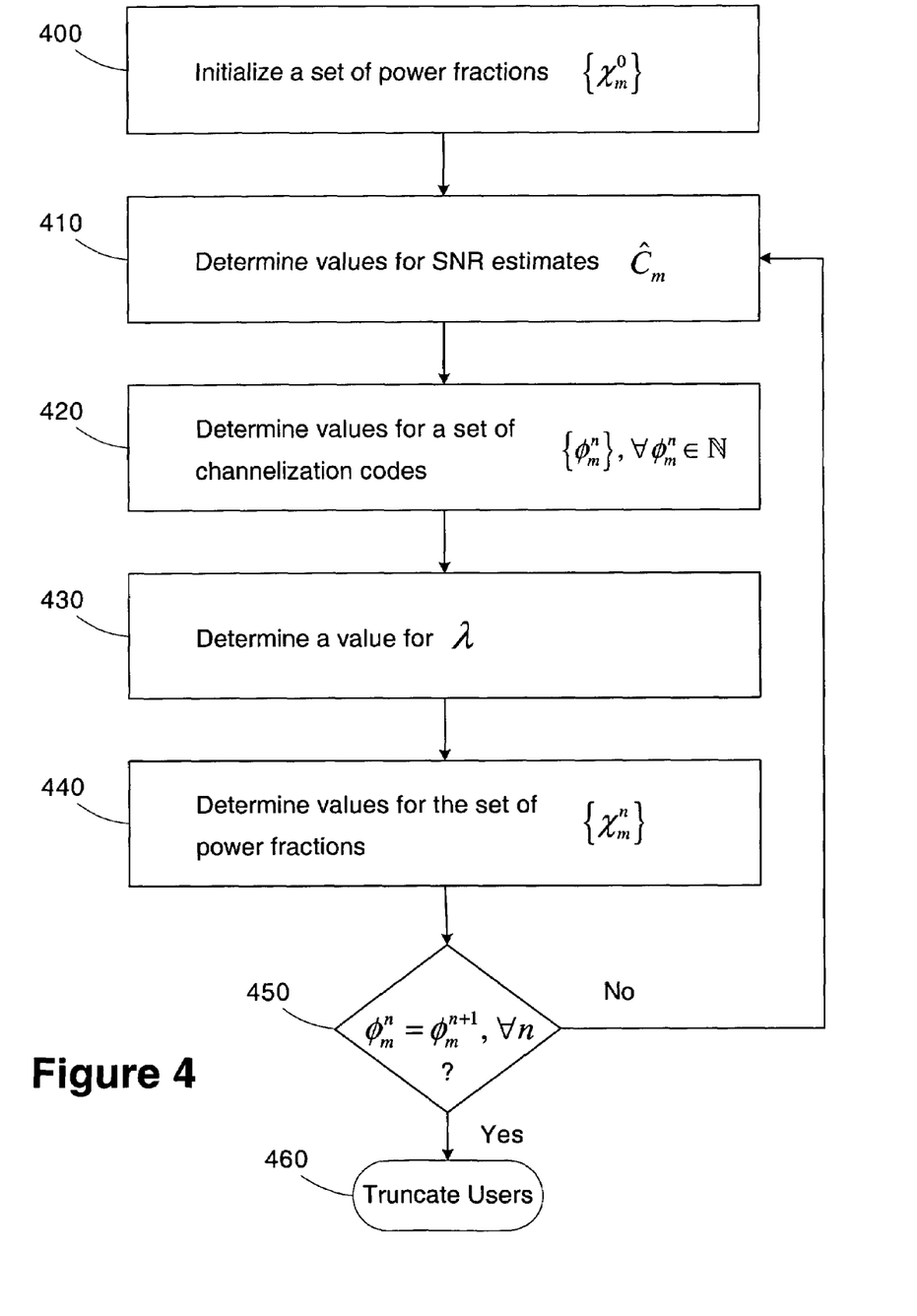
FIG. 4 is a simplified flow diagram of a second particular embodiment of a method for allocating power and channelization codes to implement the communicating of FIG. 2.

An iterative algorithm for solving the power and code assignment assuming that the user has been sorted by some fairness algorithm is now described with reference to the simplified flow diagram of FIG. 4. The code block sizes are determined for each user prior to entering the algorithm. In block 400, the set of data power fractions, $\{\chi_m^o\}$ is initialized to $P_{data}/N_c$ for all m (i.e., the available power is divided amongst the channelization codes). Of course other values for the initial power fraction assignments may be employed. In block 410, the value for the SNR estimates, $\hat{C}_m$, is determined in accordance with Equation (18). In block 420, the values for the set of channelization codes for each user, $\{\phi_m^n\}$, $\forall \phi_m^n \in \mathbb{N}$, is determined from a finite rate table (e.g., Table 1). In block 430, the value for λ is determined in accordance with equation (13). In block 440, the values for the set of power fractions, $\{\chi_m^n\}$, is determined using Equation (11). In block 450, it is determined if the value of $\phi_m^n = \phi_m^{n+1}$, $\forall n > n_0$, where $n_0$ is sufficiently large (i.e., $n_0$ is a predetermined constant for the minimum number of iterations, e.g., 20, which may vary depending on the particular implementation). If the solution has converged, the iteration terminates and the number of channelization codes is truncated at block 460. Otherwise, the iterative process repeats at block 410. Note that when selecting $\{\phi_m\}$ it is likely that the sum of all $\phi_m$ is larger than the maximum number of available channelization codes, $N_c$. Since all users 120 are sorted by priority, $\{\phi_m\}$ is truncated such that:

$$\sum_{m=1}^{M_o} \phi_m + \phi'_{M_o+1} = N_c, \quad (19)$$

where $\phi'_{M_o+1} \leq \phi_{M_o+1}$ (i.e., set $\phi_m = 0$, $\forall m > M_o+1$ and reduce the last non-zero terms in the set to meet the upper limit $N_c$). Also note that if there is reduction in $\phi_{M_o+1}$ then the transmission for the ($M_o+1$) user will likely have a higher packet error rate.

Figure 5A:
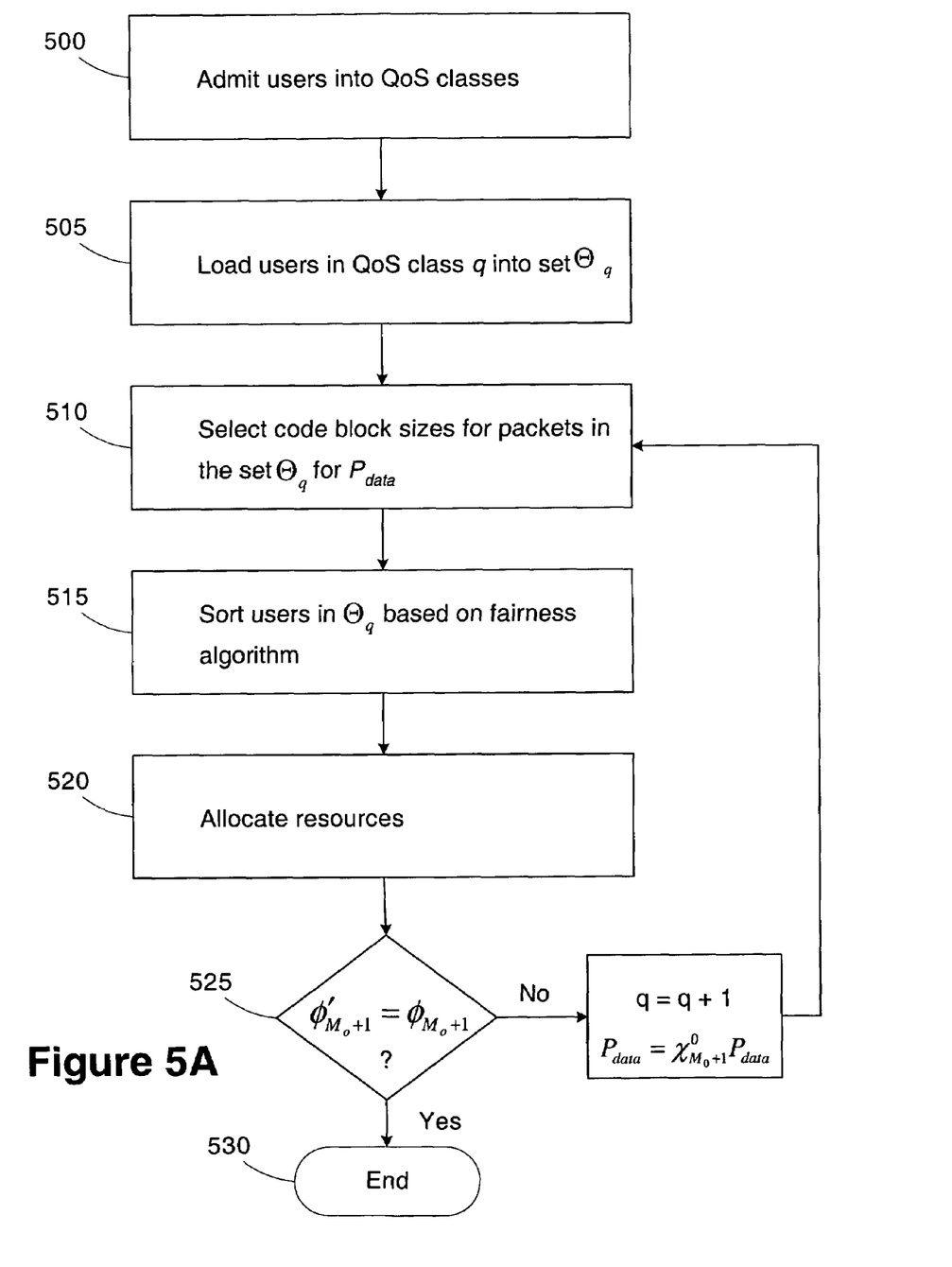
FIGS. 5A through 5C are simplified flow diagrams of methods for prioritizing users and assigning resources based on different quality of service scenarios.
Figure 5B:
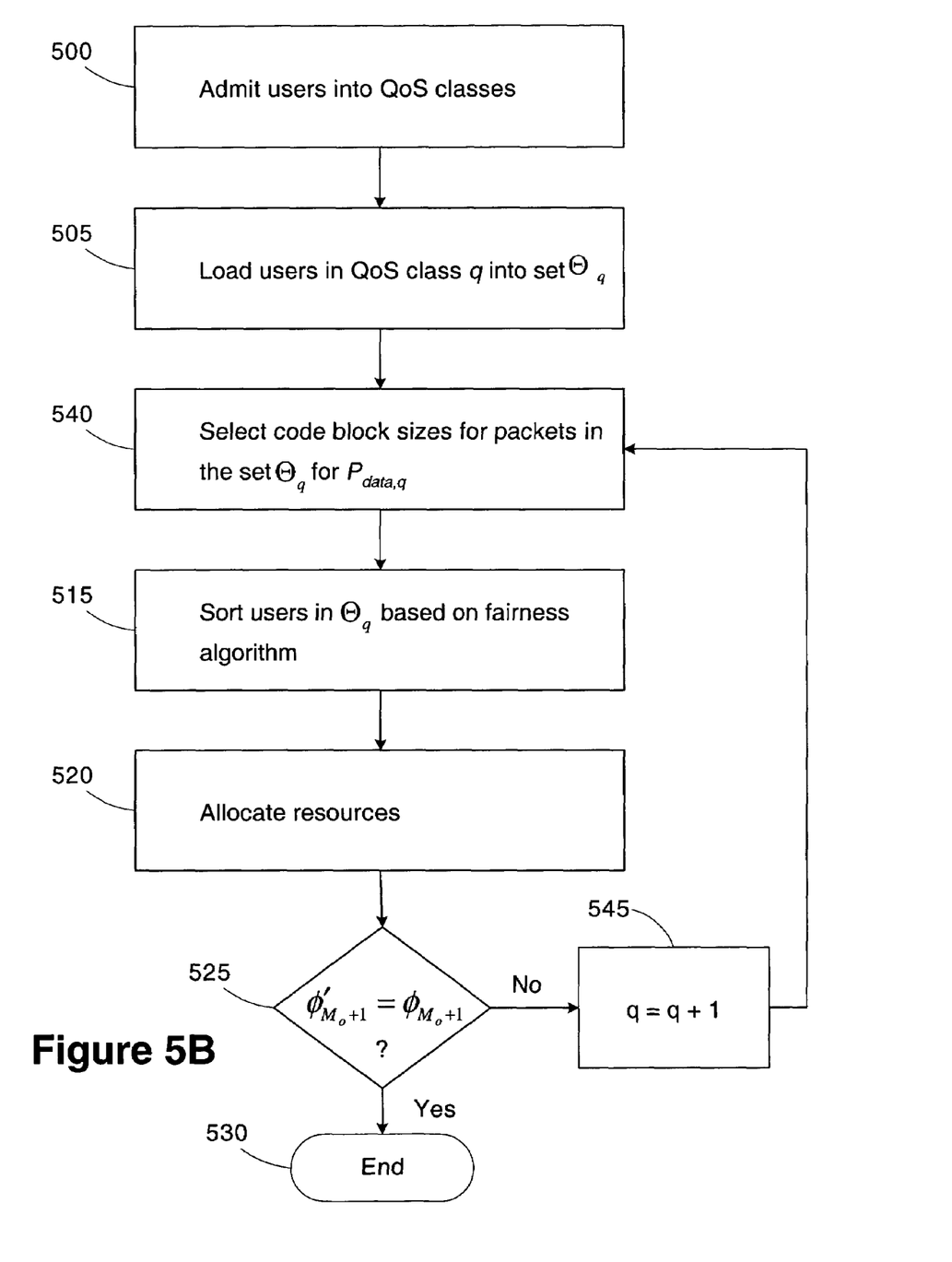
Figure 5C:
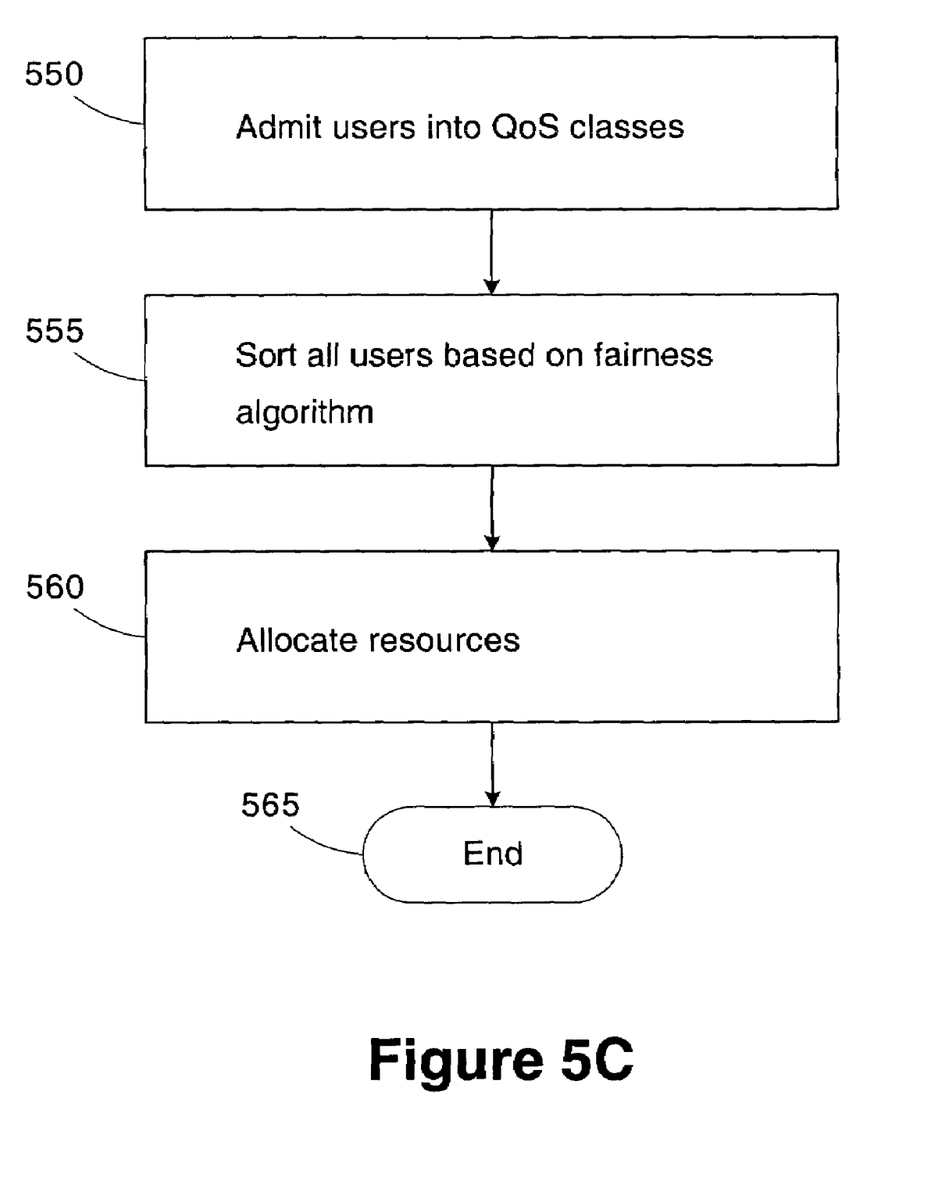

There are several different ways the allocation unit 114 may handle multiple QoS classes, depending on whether the fairness algorithm in the allocation unit 114 is QoS aware and whether during call admission control (CAC) power constraints are specified for different QoS classes. FIGS. 5A through 5C show simplified block diagrams of three different techniques for scheduling users from multiple QoS classes.

The method illustrated in FIG. 5A schedules users from the same QoS class first and allocates power and channelization codes accordingly. In the method of FIG. 5A, there are no predetermined proportions of the transmit power assigned to the various QoS classes. If for the last user 120 the number of channelization codes or power is not sufficient to meet the target packet error rate, the unused power from the last user 120 in QoS class q may be used to schedule users 120 in QoS class q+1. Note that the allocation unit 114 may reserve extra power for the next QoS class, if desired, by taking power from the last few users 120 in the current QoS class and using it for the next class.

In block 500, users 120 are admitted into QoS classes during CAC. In block 505, the users 120 in QoS class q are loaded into set $\Theta_q$. In block 510, code block sizes are selected for packets in the set, $\Theta_q$ given $P_{data}$. In block 515, the users in $\Theta_q$ are sorted in accordance with a fairness algorithm. In block 520, resources are allocated in accordance with the iterative method of FIG. 5. In block 525, it is determined if the terminating condition, $\phi'_{M_o+1} = \phi_{M_o+1}$ is met (i.e., all channelization codes and power are assigned). If the termination condition is met, the method ends in block 530. If resources still exist, the next QoS class is selected, q=q+1, and the remaining power is determined (i.e., $P_{data} = \chi_{M_o+1}{}^0 P_{data}$) in block 535. The scheduling operations then continue for the next QoS class at block 510.

The method illustrated in FIG. 5B is similar to that of FIG. 5A, but that in the method of FIG. 5B, a pre-defined amount of power is assigned to each of the QoS classes. For example, during CAC portions of the total data power $P_{data}$ may be assigned to the different QoS classes. Hence, after the users 120 are loaded into sets based on QoS class in block 505, the code block sizes are selected in block 540 for packets in the set, $\Theta_q$ given $P_{data,q}$ (i.e., the power reserved for the QoS class). Then, when the next QoS class is selected in block 545, the power need not be determined.

In the method illustrated in FIG. 5C, the allocation unit is not constrained by QoS classes or power assignment for each QoS class. The allocation unit 114 processes users from all QoS classes at the same time, so there is no need to iterate over different QoS classes. However, the QoS class may be one of the factors employed in the fairness algorithm to sort the users, so users in higher QoS may have higher relative positions in the sorted list. Users 120 are admitted into Q QoS classes in block 550. All the users 120 are sorted using a fairness algorithm in block 555. In block 560, the resources are allocated in accordance with the iterative method of FIG. 5, and the method terminates in block 565.

For systems with Hybrid-ARQ and/or Incremental Redundancy, the allocation unit may need to schedule users 120 with re-transmissions. During the re-transmission, the information size (i.e., the code block size) for the packet to be re-transmitted is kept the same as previous transmission/re-transmissions and the allocation unit optimizes the channel capacity as described above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions of the described method and system may be implemented in different locations, such as the wireless unit, the base station, a base station controller and/or mobile switching center. Moreover, processing circuitry required to implement and use the described method and system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method of communication, comprising:
   assigning at least one channelization code to each of a plurality of data packets available for a current transmission; and
   allocating available transmission power to the channelization codes based on a plurality of channel quality metrics, at least a subset of the channelization codes being assigned respective portions of the available power, wherein:
   the assigning and allocating further comprise evaluating a number representing how many channelization codes are to be assigned to each of the packets and evaluating the portion of the allocated transmission power to be assigned to each data packet using an iterative procedure that adjusts the values for the portions of the allocated transmission power and the number of channelization codes for at least one iteration responsive to the channel quality metrics and the values for the portions of the allocated transmission power and the number of channelization codes determined during at least one prior iteration to optimize a capacity of a channel for communicating the data packets during the current transmission.

2. The method of claim 1, further comprising
   determining the portions of the available power to be assigned based on the channel quality metrics and a first optimization parameter;
   determining the values of the number of channelization codes assigned to the data packets based on the determined portions of the available power and a second optimization parameter; and
   repeating over a plurality of iterations the determining of the portions of the available power and the determining of the values of the number of channelization codes.

3. The method of claim 1, further comprising
   determining the number of channelization codes assigned to each data packet based on a size of the data packet and one of the channel quality estimates associated with the data packet;
   determining the portions of the available power to be assigned to each of the channelization codes based on a first optimization parameter; and
   repeating over a plurality of iterations the determining of the number of channelization codes and the determining of the portions of the available power.

4. The method of claim 3, further comprising:
   terminating the repeating responsive to the assigned channelization codes in a first iteration being the same as the assigned channelization codes in a second later iteration; and
   truncating the subset of assigned channelization codes based on a maximum number of allowable channelization codes.

5. The method of claim 1, wherein optimizing the capacity further comprises optimizing a Shannon capacity of the channel for communicating the data packets.

6. The method of claim 1, further comprising prioritizing the plurality of data packets.

7. The method of claim 6, wherein prioritizing the plurality of data packets further comprises:
   identifying a plurality of quality of service classes;
   assigning a predetermined amount of the available power to each of the quality of service classes; and
   assigning the channelization codes and the portions of the available power based on the predetermined amounts for each quality of service classes.

8. The method of claim 6, wherein prioritizing the plurality of data packets further comprises:
  identifying a plurality of quality of service classes;
  assigning the channelization codes and the portions of the available power for a first class of the quality of service classes;
  determining a remaining amount of the available power after the assigning for the first class; and
  assigning the channelization codes and the portions of the available power for a second class of the quality of service classes based on the remaining amount of available power.

9. The method of claim 6, wherein prioritizing the plurality of data packets further comprises:
  identifying a plurality of quality of service classes;
  combining all data packets in the plurality of quality of service classes;
  sorting the combined users based on a fairness algorithm; and
  assigning the channelization codes and the portions of the available power based on the sorting.

10. A method of communication, comprising:
  providing a channel quality estimate; and
  extracting a plurality of data packets encoded with a plurality of channelization codes from a signal during a current transmission, the channelization codes and power fractions associated with the signal being assigned for the current transmission based on the channel quality estimate by determining values for the power fractions and a number of channelization codes in the plurality of channelization codes over a plurality of iterations to optimize a capacity of a channel for communicating the data packets, wherein the values for the power fractions and the number of channelization codes for a first iteration are determined based on the values for the power fractions and the number of channelization codes determined during at least one prior iteration.

11. The method of claim 10, further comprising initiating a communication link over a channel, the communication link being assigned to a quality of service class having a predetermined transmit power assignment and the power fraction is based on a portion of the predetermined transmit power.

12. The method of claim 10, wherein the channelization codes and the power fractions associated with the signal are assigned based on the channel quality estimate to optimize a Shannon capacity of the channel.

13. The method of claim 10, wherein the channelization codes and power fractions associated with the signal are assigned by:
  generating a cost function using a channel capacity equation having a first constraint, the cost function including a first optimization parameter associated with the first constraint;
  determining a value for the first optimization parameter based on a first order derivative of the cost function; and
  assigning at least one of the channelization codes and the portions of power available for communicating based on the first optimization parameter.

14. The method of claim 13, wherein the first constraint and first optimization parameter are associated with the power available for communicating, and the channelization codes and power fractions associated with the signal are assigned by determining the portions of the available power to be assigned based on the first optimization parameter.

15. The method of claim 14, wherein the channelization codes and power fractions associated with the signal are assigned by:
  defining a second constraint for the channel capacity equation based on the channelization codes, the cost function including a second optimization parameter associated with the second constraint; and
  determining the values of the number of channelization codes assigned to the data packets based on the second optimization parameter.

16. A communication system, comprising:
  a transmitter adapted to communicate data packets; and
  an allocation unit adapted to generate values for a number of channelization codes for assigning to each of a plurality of data packets available for a current transmission, generate values for assigning portions of available transmission power to at least a subset of the channelization codes based on a plurality of channel quality metrics associated with the data packets, and adjusting over a plurality of iterations the values for the portions of the available transmission power and the number of channelization codes based on the channel quality estimates to optimize a capacity of a channel for communicating the data packets during the current transmission, wherein the values for the portions of the available transmission power and the number of channelization codes for a first iteration are determined based on the values for the portions of the available transmission power and the number of channelization codes determined during at least one prior iteration.

17. The system of claim 16, wherein the allocation unit is further adapted determine portions of the available power to be assigned to at least a subset of the channelization codes based on the channel quality metrics and a first optimization parameter, determine the values of the number of channelization codes assigned to each data packets in the subset based on the determined portions of the available power and a second optimization parameter, and repeat over the plurality of iterations the determining of the portions of the available power and the determining of the values of the number of channelization codes.

18. The system of claim 16, wherein the allocation unit is further adapted determine the number of channelization codes assigned to each user in the subset based on a size of the data packet and the channel quality estimate associated with the data packets, determine portions of the available power to be assigned to at least a subset of the channelization codes based on a first optimization parameter, and repeat over the plurality of iterations the determining of the number of channelization codes and the determining of the portions of the available power.

19. The system of claim 18, wherein the allocation unit is further adapted to terminate the repeating responsive to the assigned channelization codes in a first iteration being the same as the assigned channelization codes in a second later iteration.

20. The system of claim 16, wherein the allocation unit is further adapted to determine portions of the available power to be assigned to at least a subset of the channelization codes based on channel quality metrics associated with the plurality of data packets to optimize a Shannon capacity of a channel for communicating the data packets.

21. The system of claim 16, wherein the allocation unit is further adapted to prioritize a plurality of data packets, assign at least one channelization code to at least a subset of the of the plurality of data packets and determine portions of the available power to be assigned to at least a subset of the channelization codes based on channel quality metrics associated with the plurality of data packets.

22. The system of claim 21, wherein the allocation unit is further adapted to identify a plurality of quality of service classes, assign a predetermined amount of the available power to each of the quality of service classes, and assign the channelization codes and the portions of the available power based on the predetermined amounts for each quality of service classes.

23. The system of claim 21, wherein the allocation unit is further adapted to identify a plurality of quality of service classes, assign the channelization codes and the portions of the available power for a first class of the quality of service classes, determine a remaining amount of the available power after the assigning for the first class, and assign the channelization codes and the portions of the available power for a second class of the quality of service classes based on the remaining amount of available power.

24. The system of claim 21, wherein the allocation unit is further adapted to identify a plurality of quality of service classes, combine all users in the plurality of quality of service classes, sort the combined users based on a fairness algorithm, and assign the channelization codes and the portions of the available power based on the sorting of the combined users.

25. The system of claim 21, further comprising:
means for determining a number of channelization codes assigned to each of the plurality of data packets based on a size of the data packet and a channel quality estimate associated with each data packet;
means for assigning portions of the power available to at least a subset of the channelization codes based on a first optimization parameter; and
means for repeating over the plurality of iterations the determining of the number of channelization codes and the determining of the portions of the available power.

26. The system of claim 16, wherein the allocation unit is further adapted to generate a cost function using a channel capacity equation having a first constraint, the cost function including a first optimization parameter associated with the first constraint, determine a value for the first optimization parameter based on a first order derivative of the cost function, and assign at least one of the number of channelization codes or the portions of power available for communicating based on the first optimization parameter.

27. The system of claim 26, wherein the first constraint and first optimization parameter are associated with the power available for communicating, and the allocation unit is further adapted to determine the portions of the available power to be assigned based on the first optimization parameter.

28. The system of claim 27, wherein a second constraint is defined for the channel capacity equation based on the channelization codes, the cost function includes a second optimization parameter associated with the second constraint, and the allocation unit is further adapted to determine the values of the number of channelization codes assigned to the data packets based on the second optimization parameter.

29. A system, comprising:
means for assigning at least one channelization code to each of a plurality of data packets available for a current transmission;
means for allocating available transmission power to the channelization codes based on a plurality of channel quality metrics associated with the data packets, at least a subset of the channelization codes being assigned respective portions of the available power, wherein:
the means for assigning and allocating further comprise means for evaluating a number representing how many channelization codes are to be assigned to each of the packets and evaluating the portion of the allocated transmission power to be assigned to each data packet using an iterative procedure that adjusts the values for the portions of the allocated transmission power and the number of channelization codes for at least one iteration responsive to the channel quality metrics and the values for the portions of the allocated transmission power and the number of channelization codes determined during at least one prior iteration to optimize a capacity of a channel for communicating the data packets during the current transmission.

* * * * *

UNITED STATES PATENT AND TRADEMARK OFFICE
CERTIFICATE OF CORRECTION

PATENT NO. : 7,577,120 B2
APPLICATION NO. : 10/612438
DATED : August 18, 2009
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this

Seventh Day of September, 2010

David J. Kappos
*Director of the United States Patent and Trademark Office*